US012059040B2

(12) United States Patent  
Reevell

(10) Patent No.: US 12,059,040 B2  
(45) Date of Patent: Aug. 13, 2024

(54) AEROSOL-GENERATING SYSTEMS WITH USAGE DETERMINATION

(71) Applicant: Altria Client Services LLC, Richmond, VA (US)

(72) Inventor: Tony Reevell, London (GB)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 874 days.

(21) Appl. No.: 15/438,052

(22) Filed: Feb. 21, 2017

(65) Prior Publication Data

US 2017/0238610 A1    Aug. 24, 2017

Related U.S. Application Data

(63) Continuation of application No. PCT/EP2017/053705, filed on Feb. 17, 2017.

(30) Foreign Application Priority Data

Feb. 19, 2016 (EP) .................................... 16156604

(51) Int. Cl.
   *A24F 40/53* (2020.01)
   *A24F 40/10* (2020.01)
   (Continued)

(52) U.S. Cl.
   CPC .............. *A24F 40/53* (2020.01); *G04F 10/00* (2013.01); *G06F 1/04* (2013.01); *G06F 1/3203* (2013.01);
   (Continued)

(58) Field of Classification Search
   CPC .......... A24F 47/008; G04F 10/00; G06F 1/04; G06F 1/3203; G06F 9/4451; H05B 1/0244; H05B 2203/021
   (Continued)

(56) References Cited

U.S. PATENT DOCUMENTS

| 5,269,327 A | 12/1993 | Counts et al. |
| 2011/0036346 A1 | 2/2011 | Cohen et al. |

(Continued)

FOREIGN PATENT DOCUMENTS

| CA | 2925649 A1 | 4/2015 |
| CN | 103237468 A | 8/2013 |

(Continued)

OTHER PUBLICATIONS

Extended Search Report dated Aug. 31, 2016 issued in corresponding European Application No. 16156604.7-1656.

(Continued)

*Primary Examiner* — Nathaniel E Wiehe
*Assistant Examiner* — Alba T Rosario-Aponte
(74) *Attorney, Agent, or Firm* — Harness, Dickey & Pierce, P.L.C.

(57) ABSTRACT

An electrically operated aerosol generating system may include a storage portion configured to store an aerosol forming substrate, at least one heating element configured to heat the aerosol forming substrate, a sensor configured to detect an activation of the system, a clock, and electric circuitry connected to the sensor. A usage parameter associated with operation of the system may be measured and compared, to a threshold value. A usage profile of the system may be determined based on the comparison. Such operations may be repeated at different times of day. An operating mode of the system may be selectively executed based on the determined usage profile associated with the current time of day. A monitoring procedure may be ended when the measured usage parameter exceeds a threshold value, and the duration of the monitoring procedure may be compared to a threshold duration to determine the usage profile.

20 Claims, 5 Drawing Sheets

(51) Int. Cl.
- *A24F 40/60* (2020.01)
- *G04F 10/00* (2006.01)
- *G06F 1/04* (2006.01)
- *G06F 1/3203* (2019.01)
- *G06F 9/445* (2018.01)
- *H05B 1/02* (2006.01)

(52) U.S. Cl.
CPC ......... *G06F 9/4451* (2013.01); *H05B 1/0244* (2013.01); *A24F 40/10* (2020.01); *A24F 40/60* (2020.01); *H05B 2203/021* (2013.01)

(58) Field of Classification Search
USPC ..................................................... 392/387
See application file for complete search history.

(56) References Cited

U.S. PATENT DOCUMENTS

| | | | |
|---|---|---|---|
| 2012/0048266 A1* | 3/2012 | Alelov | A61M 11/042 128/202.21 |
| 2012/0291791 A1 | 11/2012 | Pradeep | |
| 2013/0104916 A1 | 5/2013 | Bellinger et al. | |
| 2013/0319440 A1* | 12/2013 | Capuano | A61M 15/06 131/329 |
| 2014/0078258 A1 | 3/2014 | Chandraker et al. | |
| 2014/0116455 A1 | 5/2014 | Youn | |
| 2014/0123990 A1 | 5/2014 | Timmermans | |
| 2014/0174459 A1 | 6/2014 | Burstyn | |
| 2014/0229137 A1 | 8/2014 | Rusnack et al. | |
| 2014/0278250 A1 | 9/2014 | Smith et al. | |
| 2014/0305450 A1 | 10/2014 | Xiang | |
| 2014/0321837 A1 | 10/2014 | Flick | |
| 2014/0338685 A1 | 11/2014 | Amir | |
| 2015/0075546 A1 | 3/2015 | Kueny, Sr. et al. | |
| 2015/0196053 A1 | 7/2015 | Liu | |
| 2015/0245667 A1 | 9/2015 | Memari et al. | |
| 2017/0079329 A1* | 3/2017 | Zitzke | A24F 47/008 |
| 2017/0303597 A1* | 10/2017 | Tsui | H05B 1/0297 |

FOREIGN PATENT DOCUMENTS

| | | | |
|---|---|---|---|
| CN | 103889258 | A | 6/2014 |
| CN | 103929988 | A | 7/2014 |
| CN | 103974638 | A | 8/2014 |
| CN | 105208884 | A | 12/2015 |
| CN | 105307521 | A | 2/2016 |
| EP | 2257195 | B1 | 6/2012 |
| EP | 2468118 | A1 | 6/2012 |
| EP | 2471392 | B1 | 9/2013 |
| EP | 2915443 | A1 | 9/2015 |
| GB | 2507103 | A | 4/2014 |
| GB | 2519101 | A | 4/2015 |
| JP | 2015531600 | A | 11/2015 |
| KZ | 26743 | B | 3/2013 |
| RU | 122000 | U1 | 11/2012 |
| WO | WO-2008/077271 | A1 | 7/2008 |
| WO | WO-2009/118085 | A1 | 10/2009 |
| WO | WO-2009/127401 | A1 | 10/2009 |
| WO | WO-2011/137453 | A2 | 11/2011 |
| WO | WO-2011/146329 | A2 | 11/2011 |
| WO | WO-2012/027350 | A2 | 3/2012 |
| WO | WO-2012/072790 | A1 | 6/2012 |
| WO | WO-2012/085203 | A1 | 6/2012 |
| WO | WO-2012/085207 | A1 | 6/2012 |
| WO | WO-2013/060781 | A1 | 5/2013 |
| WO | WO-2013/060784 | A2 | 5/2013 |
| WO | WO-2013/098398 | A2 | 7/2013 |
| WO | WO-2014/040988 | A2 | 3/2014 |
| WO | WO-2014/058678 | A1 | 4/2014 |
| WO | WO-2014/138244 | A1 | 9/2014 |
| WO | WO-2014/150247 | A1 | 9/2014 |
| WO | WO-2014/166037 | A1 | 10/2014 |
| WO | WO-2014/166121 | A1 | 10/2014 |
| WO | WO-2014/169412 | A1 | 10/2014 |
| WO | WO-2015/038981 | A2 | 3/2015 |
| WO | WO-2015/063126 | A1 | 5/2015 |

OTHER PUBLICATIONS

International Search Report and Written Opinion dated Jun. 7, 2017 issued in corresponding International Application No. PCT/EP2017/053705.
Russian Notice of Allowance and Search Report dated Mar. 11, 2020 for corresponding Russian Application No. 2018133022/12(054142).
Chinese Office Action dated Sep. 3, 2020 issued in corresponding Chinese Application No. 201780008306.3.
Jin JiQiong, "Effects of smoking regimen and parameter on e-cigarette total particulate matter (TPM) delivery amount of its aerosol", pp. 65-70.
Notice of Allowance and Search Report for Chinese Patent Application No. 201780008306.3 mailed on Feb. 4, 2021 and English translation thereof.
Allem et al., "Characteristics of emerging adulthood and e-cigarette use: Findings from a pilot study," Addictive Behaviors, 2015, vol. 50, p. 40-44.
Japanese Decision to Grant dated Feb. 4, 2021 issued in corresponding Japanese Application No. 2018-543083 and English translation thereof.
KR Office Action for Korean Patent Application No. 10-2018-7021600 mailed on Mar. 13, 2024 and English translation thereof.

* cited by examiner

AEROSOL-GENERATING SYSTEMS WITH USAGE DETERMINATION

CROSS-REFERENCE TO RELATED APPLICATIONS

This application is a continuation of, and claims priority to, international application no. PCT/EP2017/053705, filed on Feb. 17, 2017, and further claims priority under 35 U.S.C. § 119 to European Patent Application No. 16156604.7, filed Feb. 19, 2016, the entire contents of each of which are incorporated herein by reference.

BACKGROUND

Field

One or more example embodiments relate to aerosol-generating systems which operate by heating an aerosol-forming substrate. In particular, one or more example embodiments relate to electrically operated aerosol generating systems and to methods of operating electrically operated aerosol generating systems.

Description of Related Art

Some types of aerosol-generating systems include electrically operated aerosol generating systems. Handheld electrically operated aerosol generating systems consisting of a device portion comprising a battery and control electronics, and a cartridge portion comprising a supply of aerosol-forming substrate, and an electrically operated vaporizer, are known. A cartridge comprising both a supply of aerosol-forming substrate and a vaporizer is sometimes referred to as a "cartomizer". The vaporizer is typically a heater assembly. In some known examples, the aerosol-forming substrate is a liquid aerosol-forming substrate and the vaporizer comprises a coil of heater wire wound around an elongate wick soaked in liquid aerosol-forming substrate. The cartridge may include, in addition to the liquid storage portion and the vaporizer, an outlet-end insert through which air may be drawn to draw an aerosol generated by the vaporizer through the outlet-end insert and out of the aerosol-generating system.

Thus, electrically operated aerosol generating systems that vaporize an aerosol-forming liquid by heating to form an aerosol typically comprise a coil of wire that is wrapped around a capillary material that holds the liquid. Electric current passing through the wire causes resistive heating of the wire which vaporizes the liquid in the capillary material. The capillary material is typically held within an airflow path so that air is drawn past the wick and entrains the vapor. The vapor subsequently cools to form an aerosol.

This type of system is typically activated using a push switch, or an air flow-activated switch, by which the adult vaper has control over how the system is operated. This has led to such aerosol generating systems being used according to a number of different usage profiles. For example, certain adult vapers may control a number of discrete, intense draws of air through the systems in a short period of time, followed by a long period of non-use, while other adult vapers may control a large number of less intense draws of air through the systems spread out over a longer period of time.

It would be desirable to provide a method of operating an electrically operated aerosol generating system which allows the aerosol generating system to be customized according to its usage profile. It would also be desirable to provide an electrically operated aerosol generating system which is configured to allow customization according to its usage profile.

SUMMARY

According to some example embodiments, a method of operating an electrically operated aerosol generating system may include executing a monitoring procedure associated with the electrically operated aerosol generating system at different times of day to determine a usage profile associated with the electrically operated aerosol generating system corresponding to different times of day, respectively, and selectively operating the electrically operated aerosol generating system according to a selected operating mode, where the selected operating mode is selected based on the determined usage profile corresponding to a current time of day. The electrically operated aerosol generating system may include a storage portion configured to store an aerosol forming substrate, an electric heater comprising at least one heating element configured to heat the aerosol forming substrate, a sensor configured to detect an activation of the electrically operated aerosol generating system, a clock, and electric circuitry connected to the sensor. The monitoring procedure may include, for a given time of day, measuring, using the sensor, a usage parameter of the electrically operated aerosol generating system corresponding to the given time of day, comparing the measured usage parameter corresponding to the given time of day to a threshold value, and determining a usage profile of the electrically operated aerosol generating system corresponding to the given time of day based on the comparison of the measured usage parameter corresponding to the given time of day to the threshold value.

The usage parameter may include an activation duration during the monitoring procedure, a total activation duration during the monitoring procedure, a total number of activations during the monitoring procedure, an inactivation duration during the monitoring procedure, and/or a total inactivation duration during the monitoring procedure.

The determining may include selecting a first usage profile based on a determination that the measured usage parameter corresponding to the given time of day exceeds the threshold value, and selecting a second usage profile based on a determination that the measured usage parameter corresponding to the given time of day does not exceed the threshold value.

The executing the monitoring procedure associated with the electrically operated aerosol generating system at different times of day to determine a usage profile associated with the electrically operated aerosol generating system at different times of day may include executing the monitoring procedure at least once during an evening time period to determine a usage profile associated with the electrically operated aerosol generating system that corresponds to the evening time period, and executing the monitoring procedure at least once prior to the evening time period to determine a usage profile associated with the electrically operated aerosol generating system that corresponds to a time period prior to the evening time period.

The method may include starting a timer to measure a duration of the monitoring procedure, wherein the determining is executed based on a determination that a duration of the monitoring procedure exceeds a threshold duration.

According to some example embodiments, a method of operating an electrically operated aerosol generating system may include executing a monitoring procedure associated with the electrically operated aerosol generating system at different times of day to determine a usage profile associated with the electrically operated aerosol generating system at different times of day and selectively operating the electrically operated aerosol generating system according to a selected operating mode, where the selected operating mode is selected based on the determined usage profile corresponding to a current time of day. The electrically operated aerosol generating system may include a storage portion configured to store an aerosol forming substrate, an electric heater including at least one heating element configured to heat the aerosol forming substrate, a sensor configured to detect an activation of the system, a clock, and electric circuitry connected to the sensor. The monitoring procedure may include, for a given time of day, starting a timer to measure a duration of the monitoring procedure, measuring, using the sensor, a usage parameter of the electrically operated aerosol generating system corresponding to the given time of day, comparing the measured usage parameter corresponding to the given time of day to a threshold value, ending the monitoring procedure corresponding to the given time of day based on a determination that the measured usage parameter corresponding to the given time of day exceeds the threshold value, and determining a usage profile of the electrically operated aerosol generating system corresponding to the given time of day based on comparing the duration of the monitoring procedure corresponding to the given time of day to a threshold duration.

The usage parameter may be an inactivation duration during the monitoring procedure.

The determining may include selecting a first usage profile based on a determination that the duration of the monitoring procedure corresponding to the given time of day exceeds the threshold duration, and selecting a second usage profile based on a determination that the duration of the monitoring procedure corresponding to the given time of day does not exceed the threshold duration.

The executing may be based on a determination that a first activation is detected by the sensor.

The measuring, in a given monitoring procedure corresponding to a given time of day, may include measuring an activation duration for any activations detected during the monitoring procedure corresponding to the given time of day, and disregarding, from the measured usage parameter corresponding to the given time of day, any activations for which the activation duration is less than a minimum activation duration threshold.

The method may include calculating an estimated remaining amount of aerosol forming substrate in the storage portion.

The calculating may include applying a correction coefficient according to the selected operating mode.

The electrically operated aerosol generating system may further include a display. The method may further include displaying information on the display according to the selected operating mode.

The information may be based on the estimated remaining amount of aerosol forming substrate in the storage portion. The information may indicate a remaining number of activations, a remaining activation duration, and/or a remaining number of aerosol generations.

According to some example embodiments, an electrically operated aerosol generating system may include a storage portion configured to store an aerosol forming substrate, an electric heater includes at least one heating element configured to heat the aerosol forming substrate, a sensor configured to detect an activation of the system, a clock, and electric circuitry connected to the sensor. The electric circuitry may be configured to determine a usage profile of the system at different times of day based on comparing a usage parameter measured by the sensor at different times of day to the threshold value, and selectively operate the electrically operated aerosol generating system according to a selected operating mode, the selected operating mode being selected based on a determined usage profile associated with a current time of day.

The determining may include, for a given time of day, selecting a first usage profile based on a determination that a measured usage parameter corresponding to the given time of day exceeds the threshold value, and selecting a second usage profile based on a determination that the measured usage parameter corresponding to the given time of day does not exceed the threshold value.

The electric circuitry may be configured to perform the determining at least once during an evening time period to determine a usage profile associated with the electrically operated aerosol generating system that corresponds to the evening time period, and perform the determining at least once prior to the evening time period to determine a usage profile associated with the electrically operated aerosol generating system that corresponds to a time period prior to the evening time period.

According to some example embodiments, an electrically operated aerosol generating system may include a storage portion configured to store an aerosol forming substrate, an electric heater including at least one heating element configured to heat the aerosol forming substrate, a sensor configured to detect an activation of the electrically operated aerosol generating system, a clock, and electric circuitry connected to the sensor. The electric circuitry may be configured to measure a duration of a monitoring procedure executed at a given time of day, determine a usage profile of the system at different times of day based on measuring durations of monitoring procedures executed at different times of day and comparing the durations corresponding to the different times of day to a threshold, and selectively operate the electrically operated aerosol generating system according to a selected operating mode, the selected operating mode being selected based on a determined usage profile associated with a current time of day.

The determining may include, for a given time of day, selecting a first usage profile based on a determination that a measured usage parameter corresponding to the given time of day exceeds the threshold value, and selecting a second usage profile based on a determination that the measured usage parameter corresponding to the given time of day does not exceed the threshold value.

The electric circuitry may be configured to perform the measuring and the determining at least once during an evening time period to determine a usage profile associated with the electrically operated aerosol generating system that corresponds to the evening time period, and perform the measuring and the determining at least once prior to the evening time period to determine a usage profile associated with the electrically operated aerosol generating system that corresponds to a time period prior to the evening time period.

BRIEF DESCRIPTION OF THE DRAWINGS

Example embodiments of the inventive concepts will now be described, by way of example only, with reference to the accompanying drawings, in which.

DETAILED DESCRIPTION

Figure 1:
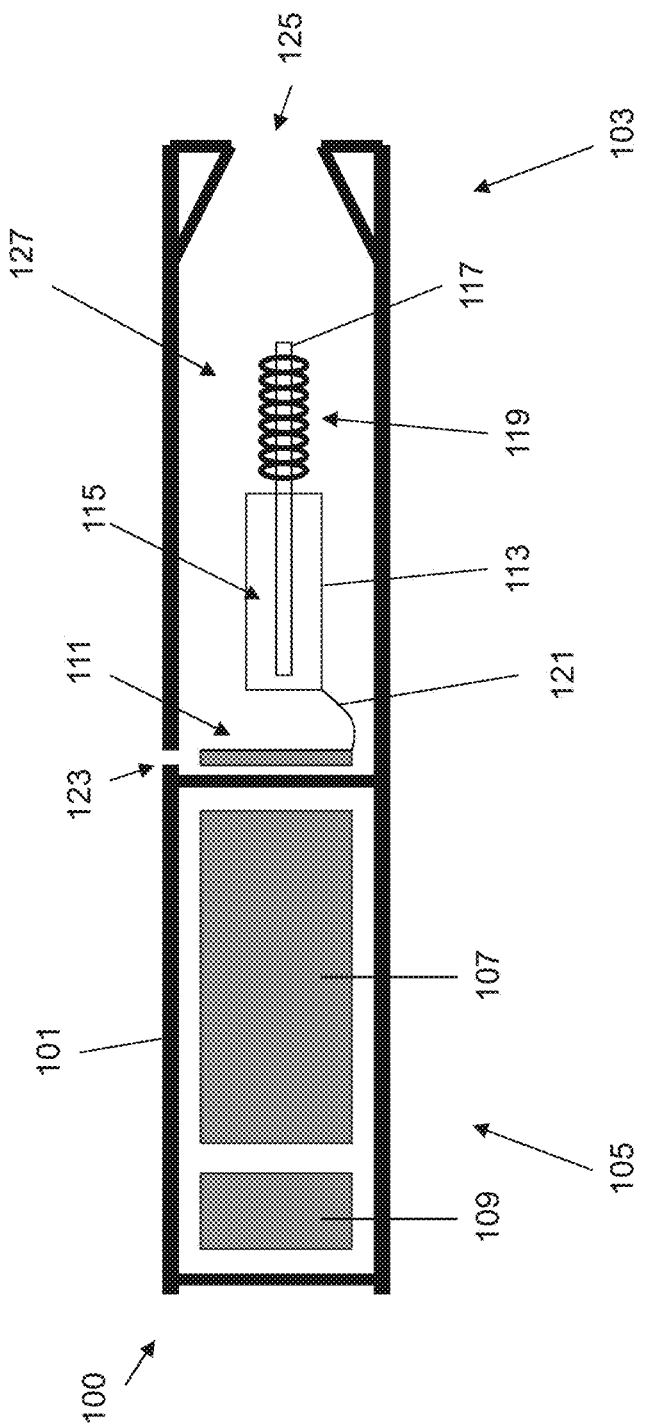
FIG. 1 shows one example of an electrically heated aerosol generating system in accordance with some example embodiments.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, and/or elements, but do not preclude the presence or addition of one or more other features, integers, steps, operations, elements, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, regions, layers and/or sections, these elements, regions, layers and/or sections should not be limited by these terms. These terms are only used to distinguish one element, region, layer or section from another region, layer or section. Thus, a first element, region, layer or section discussed below could be termed a second element, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Some example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of this disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

According to some example embodiments, a method of operating an electrically operated aerosol generating system may include providing an electrically operated aerosol generating system. The electrically operated aerosol generating system may include a storage portion configured to store an aerosol forming substrate, an electric heater comprising at least one heating element configured to heat the aerosol forming substrate, a sensor configured to detect an activation of the system, a clock, and electric circuitry connected to the sensor. The method may include initiating a monitoring procedure; measuring a usage parameter of the system during the monitoring procedure using the sensor; comparing the measured usage parameter to a threshold value for that usage parameter; determining a usage profile of the system based on the comparison of the measured usage parameter to the threshold value; repeating at different times of day the steps of initiating a monitoring procedure, measuring a usage parameter, comparing the measured usage parameter, and determining a usage profile, to determine the usage profile at different times of day, and selecting an operating mode of the system based on the determined usage profile associated with (e.g., corresponding to) the current time of day.

With this method, a plurality of monitoring procedures are carried out at different times of day to determine usage profiles at different times of day (e.g., usage profiles corresponding to different times of day, respectively). This includes carrying out a plurality of monitoring procedures during a single day, or over several days.

Advantageously, with this method, the adult vaper habits are monitored and the operation of the system changed according to those adult vaper habits. This allows the system to take into consideration how it is being used and to adapt accordingly. This may be of particular benefit where different usage profiles result in different consumption rates of the aerosol-forming substrate. For example, it may allow the system to calculate a more accurate estimation of the rate of consumption of the aerosol-forming substrate. It may also be of benefit where different usage profiles result in different characteristics, such as, increased temperature of the system, start-up time, aerosol characteristics, or power consumption. Further, by determining the usage profile at different times of the day and selecting an operating mode associated with the current time of day, the system may take into account any time-dependent variations in usage profile, for example where an adult vaper exhibits an aerosol generation profile during the day and a grazing profile during the evening, or vice versa.

As used herein, the term "usage parameter" refers to a measurable, numerical factor that defines an aspect of the conditions of operation of the aerosol generating system, in particular in relation to the number of activations or draws, the duration of a given activation, the total duration of a plurality of activations, the interval between two consecutive activations, the total interval between consecutive activations in a plurality of activations, air flow draw intensity, or frequency of activation.

As used herein, the term "usage profile" refers to a characterization of one or more usage parameters of an aerosol generating system over a period of time.

As used herein, the term "operating mode" refers to a predefined manner in which one or more aspects of the operation of an aerosol generating system are carried out within the system by the electric circuitry.

In its simplest form, the method may be carried out by initiating a first monitoring procedure at a first time of day; measuring a first usage parameter of the system during the first monitoring procedure using the sensor; comparing the first measured usage parameter to a threshold value; determining a usage profile of the system at the first time of day based on the comparison of the first measured usage parameter to the threshold value; initiating a second monitoring procedure at a second time of day different to the first time of day; measuring a second usage parameter of the system during the second monitoring procedure using the sensor; comparing the second measured usage parameter to a threshold value; determining a usage profile of the system at the second time of day based on the comparison of the second measured usage parameter to the threshold value, and selecting an operating mode of the system based on the determined usage profile associated with the current time of day (e.g., selectively operating the electrically operated aerosol generating system according to a selected operating mode, where the selected operating mode is selected based on the determined usage profile corresponding to a current time of day).

The usage parameter may comprise any suitable measurable condition. The usage parameter may comprise an activation duration during the monitoring procedure, a total activation duration during the monitoring procedure, a total number of activations during the monitoring procedure, an inactivation duration during the monitoring procedure, a total inactivation duration during the monitoring procedure, or any combination thereof.

In some example embodiments, the step of determining a usage profile is carried out by choosing a first usage profile if the measured usage parameter exceeds the threshold value and choosing a second usage profile if the measured usage parameter does not exceed the threshold value. Thus, the operation of the system can be adapted according to the usage profile in a simple manner. The step of determining a usage profile may be carried out by comparing the measured usage parameter to a plurality of threshold values for that usage parameter. This may allow one of a plurality of operating modes to be selected, allowing for increased adaptability. For example, the step of determining a usage profile may be carried out by choosing a first usage profile if the measured usage parameter does not exceed a first threshold value, choosing a second usage profile if the measured usage parameter exceeds the first threshold value but does not exceed a second, higher threshold value, and choosing a third usage profile if the measured usage parameter exceeds the first and second threshold values. It will be appreciated that this process may be used with any number of operating modes, for example by increasing the number of threshold values to which the measured usage parameter is compared.

The method of the inventive concepts includes repeating at different times of day the steps of initiating a monitoring procedure, measuring a usage parameter, comparing the measured usage parameter, and determining a usage profile, to determine the usage profile at different times of day. The usage profile of the system may be determined for any suitable times of day (e.g., usage profiles corresponding to different times of day, respectively). In some example embodiments, the steps of initiating a monitoring procedure, measuring a usage parameter, comparing the measured usage parameter, and determining a usage profile are carried out at least once during evening time to determine a usage profile of the system during evening time and at least once prior to evening time to determine a usage profile of the system prior to evening time. This allows the system to take into account both pre-evening usage and during-evening usage, when usage of the system may differ significantly. As used herein, the term "evening time" refers to the period of time from 5 pm to 12 am, more preferably from 6 pm to 12 am local time.

The method may further comprise the step of starting a timer to measure a duration of the monitoring procedure. In such embodiments, the step of determining a usage profile may be carried out when the duration of the monitoring procedure exceeds a threshold duration. The step of determining a usage profile may be carried out before the duration of the monitoring procedure has reached the threshold duration. In some example embodiments, the usage parameter comprises a total number of activations during the monitoring procedure. In such embodiments, the threshold duration and the threshold number of activations may be any suitable values. For example, the threshold duration may be from about 5 minutes to about 30 minutes, or from about 10 minutes to about 20 minutes. In one example, threshold duration is set at about 15 minutes. The threshold number of activations may depend on the threshold duration. For example, the threshold number of activations may be from 1 to 5 activations per minute, from 1 to 3 activations per minute, or about 2 activations per minute. In one particular embodiment, the threshold number of activations is 30 activations and the threshold duration is 15 minutes.

In some example embodiments of the inventive concepts, there is provided a method of operating an electrically operated aerosol generating system, the method comprising the steps of: providing an electrically operated aerosol generating system comprising a storage portion for storing an aerosol forming substrate, an electric heater comprising at least one heating element configured to heat the aerosol forming substrate, a sensor configured to detect an activation of the system, a clock, and electric circuitry connected to the sensor; initiating a monitoring procedure having a desired (or, alternatively, predetermined) monitoring duration; measuring a usage parameter of the system during the monitoring procedure using the sensor; comparing the measured usage parameter at the end of the monitoring duration to a threshold value for that usage parameter; determining a usage profile of the system based on the comparison of the measured usage parameter to the threshold value; repeating at different times of day the steps of initiating a monitoring procedure, measuring a usage parameter, comparing the measured usage parameter, and determining a usage profile, to determine the usage profile at different times of day, and selecting an operating mode of the system based on the determined usage profile associated with the current time of day.

In some example embodiments of the inventive concepts, there is provided a method of operating an electrically operated aerosol generating system, the method comprising the steps of: providing an electrically operated aerosol generating system comprising a storage portion for storing an aerosol forming substrate, an electric heater comprising at least one heating element configured to heat the aerosol forming substrate, a sensor configured to detect an activation of the system, a clock and electric circuitry connected to the sensor; initiating ("executing") a monitoring procedure; starting a timer to measure a duration of the monitoring procedure; measuring a usage parameter of the system during the monitoring procedure using the sensor; comparing the measured usage parameter to a threshold value; ending the monitoring procedure when the measured usage parameter exceeds the threshold value; determining a usage profile of the system by comparing the duration of the monitoring procedure to a threshold duration; repeating at different times of day the steps of initiating a monitoring procedure, starting a timer, measuring a usage parameter, comparing the measured usage parameter, and determining a usage profile, to determine the usage profile at different times of day (e.g., usage profiles corresponding to different times of day, respectively), and selecting an operating mode of the system based on the determined usage profile corresponding to the current time of day.

As with the method according to some example embodiments, with this method, the adult vaper habits are monitored and the operation of the system changed according to those adult vaper habits. This allows the system to take into consideration how it is being used and to adapt accordingly. This may be of particular benefit where different usage profiles result in different consumption rates of the aerosol-forming substrate. For example, it may allow the system to calculate a more accurate estimation of the rate of consumption of the aerosol-forming substrate. It may also be of benefit where different usage profiles result in different characteristics, such as, increased temperature of the system, start-up time, aerosol characteristics, or power consumption. The method of some example embodiments differs from the method of some example embodiments in that the determination of the usage profile is based on how long it takes for the usage parameter to exceed the threshold value for the usage parameter, rather than on the value of the usage parameter relative to a threshold value. Further, by determining the usage profile at different times of the day and selecting an operating mode associated with (e.g., corresponding to) the current time of day, the system may take into account any time-dependent variations in usage profile, for example where an adult vaper exhibits an aerosol generation profile during the day and a grazing profile during the evening, or vice versa.

In its simplest form, the method according to some example embodiments may be carried out by initiating a first monitoring procedure at a first time of day; starting a timer to measure a duration of the first monitoring procedure; measuring a first usage parameter of the system during the first monitoring procedure (e.g., a first usage parameter corresponding to the first time of day) using the sensor; comparing the first measured usage parameter to a threshold value; ending the monitoring procedure when the first measured usage parameter exceeds the threshold value, determining a usage profile of the system at ("corresponding to") the first time of day by comparing the duration of the first monitoring procedure to a threshold duration; initiating a second monitoring procedure at a second time of day different to the first time of day; measuring a second usage parameter of the system during the second monitoring procedure (e.g., a second usage parameter corresponding to the second time of day) using the sensor; comparing the second measured usage parameter to a threshold value; ending the monitoring procedure when the second measured usage parameter exceeds the threshold value, determining a usage profile of the system at ("corresponding to") the second time of day by comparing the duration of the second monitoring procedure to a threshold duration, and selecting an operating mode of the system (e.g., selectively operating the electrically operated aerosol generating system according to a selected operating mode) based on the determined usage profile associated with ("corresponding to") the current time of day.

The usage profile of the system may be determined for any suitable times of day. In some example embodiments, the steps of initiating ("executing") a monitoring procedure, starting a timer, measuring a usage parameter, comparing the measured usage parameter, and determining a usage profile are carried out at least once during evening time to determine a usage profile of the system during evening time and at least once prior to evening time to determine a usage profile of the system prior to evening time. This allows the system to take into account both pre-evening usage and during-evening usage, when usage of the system may differ significantly.

The usage parameter may comprise any suitable measurable. The usage parameter may comprise an activation duration during the monitoring procedure, a total activation duration during the monitoring procedure, a total number of activations during the monitoring procedure, an inactivation duration during the monitoring procedure, a total inactivation duration during the monitoring procedure, or any combination thereof. In some example embodiments, the usage parameter is an inactivation duration. In such embodiments, the interval between successive activations is measured and the monitoring procedure ended when the interval exceeds a desired (or, alternatively, predetermined) inactivation duration threshold. The inactivation duration threshold may be any suitable length of time. For example, the inactivation duration threshold may be from about 1 minute to about 10 minutes, from about 1 minute to about 5 minutes, or from about 10 minutes to about 3 minutes. In some example embodiments, the inactivation duration threshold is about 2 minutes.

In some example embodiments, the step of determining a usage profile corresponding to a given time of day is carried out by choosing ("selecting") a first usage profile if ("based on a determination that") the duration of the monitoring procedure corresponding to the given time of day exceeds the threshold duration and choosing ("selecting") a second usage profile if ("based on a determination that") the duration of the monitoring procedure corresponding to the given time of day does not exceed the threshold duration. Thus, the operation of the system can be adapted according to the usage profile in a simple manner. The step of determining a usage profile may be carried out by comparing the duration of the monitoring procedure to a plurality of threshold duration values. This may allow one of a plurality of operating modes to be selected, allowing for increased adaptability. For example, the step of determining a usage profile may be carried out by choosing a first usage profile if the duration of the monitoring procedure does not exceed a first threshold duration, choosing a second usage profile if the duration of the monitoring procedure exceeds the first threshold duration but does not exceed a second, longer threshold duration, and choosing a third usage profile if the duration of the monitoring procedure exceeds the first and second threshold durations. It will be appreciated that this process may be used with any number of operating modes, for example by increasing the number of threshold durations to which the duration of the monitoring procedure is compared.

In any of the above embodiments, the step of initiating a monitoring procedure may be carried out automatically when a first activation is detected by the sensor. This allows the system to be customized according to its usage without any undue burden on the adult vaper. It also ensures that the monitoring procedure is only carried out when an activation has been detected, rather than during any periods in which no activations take place. This can reduce power consumption. As used herein, the term "first activation" refers to the first use of the system following a period of non-use. This may be the very first use of the system, or the first use of the system following the end of a previous monitoring procedure.

The method may comprise the step of measuring an inactivation duration between successive activations and ending the monitoring procedure when the inactivation duration exceeds an inactivation duration threshold. For example, the inactivation duration threshold may be from about 1 minute to about 10 minutes, from about 1 minutes to about 5 minutes, or from about 10 minutes to about 3 minutes. In some examples, the inactivation duration threshold is about 2 minutes. In such examples, the "first activation" may be the first activation detected following the ending of the monitoring procedure.

In any of the above embodiments, the step of measuring a usage parameter may further comprise measuring an activation duration for any activations detected during the monitoring procedure and disregarding from the measured usage parameter any activations for which the activation duration is less than a minimum activation duration threshold. Advantageously, this means that the system can avoid counting as valid events any activations which do not correspond to a normal draw. For example when an adult vaper activates the device without drawing any aerosol, such as in order to prime the device. This may improve the accuracy with which the usage profile is determined. The minimum activation duration threshold may be any suitable period of time. For example, from between about 0.5 seconds to 2 seconds. In one particular example, the minimum activation duration threshold is about 1 second.

In any of the above embodiments, the method may further comprise the step of calculating an estimated remaining amount of aerosol forming substrate in the storage portion. This may be achieved by any known process. For example, the remaining amount of aerosol forming substrate may be estimated by measuring the weight of the remaining aerosol forming liquid or by monitoring the total activation time and referring to a look-up table or using a formula to estimate the amount of aerosol forming substrate that has already been consumed. Other factors may be used as inputs in the estimation of the aerosol forming substrate remaining, such as power delivered to the heating element, temperature of the heating element, resistance of the heating element, and airflow through the system.

The step of calculating an estimated remaining amount may comprise applying a correction coefficient according to the operating mode selected. This allows the system to correct for differences in the consumption rate which result from different usage profiles. This may result in more a more accurate estimation of the remaining amount of aerosol-forming substrate than by calculating without a correction coefficient. The correction coefficient may be determined empirically or by using typical values stored in the device.

The system may further comprise a display. In such examples, the method may further comprise the step of displaying information on the display according to the operating mode selected. This allows the device to be customized according to the usage profile. This may allow more appropriate or useful information to be displayed than with systems in which the same information is displayed regardless of usage profile.

The information may be based on the estimated remaining amount of aerosol forming substrate in the storage portion. In such examples, the information may comprise a remaining number of activations, a remaining activation duration, a remaining number of aerosol generations, or any combination thereof.

In some examples, where a first operating mode is selected, the system may display information on a display showing the estimated number of draws remaining or the usage time remaining. This may be calculated from an estimation of the remaining amount of aerosol forming substrate and from an average amount of aerosol forming substrate consumed during each activation. The remaining amount of aerosol forming substrate may be estimated by measuring the weight of the remaining aerosol forming liquid or by monitoring the total activation time and referring to a look-up table or using a formula to estimate the amount of aerosol forming substrate that has already been consumed. Other factors may be used as inputs in the estimation of the aerosol forming substrate remaining, such as power delivered to the heating element, temperature of the heating element, resistance of the heating element, and airflow through the system. The average amount of aerosol forming substrate consumed during each activation may be determined by monitoring the use of the system, or by using typical values stored in the device.

In other examples, where a second operating mode is selected, the system may display information on a display showing the estimated number of aerosol generations remaining.

According to some example embodiments of the inventive concepts, there is provided an electrically operated aerosol generating system comprising: a storage portion for storing ("configured to store") an aerosol forming substrate; an electric heater comprising at least one heating element configured to heat the aerosol forming substrate; a sensor configured to detect an activation of the system; a clock and electric circuitry connected to the sensor and configured to compare a usage parameter measured by the sensor to a threshold value, determine a usage profile of the system at different times of day based on the comparison of the measured usage parameter at different times of day to the threshold value, and select an operating mode of the system based on the determined usage profile associated with the current time of day.

According to some example embodiments of the inventive concepts, there is provided an electrically operated aerosol generating system comprising: a storage portion for storing an aerosol forming substrate; an electric heater comprising at least one heating element configured to heat the aerosol forming substrate; a sensor configured to detect an activation of the system; a clock and electric circuitry connected to the sensor and configured to measure a duration of a monitoring procedure, compare a usage parameter measured by the sensor to a threshold value, determine a usage profile of the system at different times of day based on a comparison of the duration of the monitoring procedure to a threshold, and select an operating mode of the system based on the determined usage profile associated with the current time of day.

According to some example embodiments of the inventive concepts, there is provided an electrically operated aerosol generating system comprising: a storage portion for storing an aerosol forming substrate; an electric heater comprising at least one heating element configured to heat the aerosol forming substrate; a sensor configured to detect an activation of the system; a clock and electric circuitry connected to the sensor and configured to carry out the method of any of the embodiments described above.

The aerosol-generating system may be portable. The system may be a handheld aerosol-generating system. The aerosol generating system may be an electrically operated aerosol generating system. The aerosol-generating system may have a total length between about 30 mm and about 150 mm. The aerosol-generating system may have an external diameter between about 5 mm and about 30 mm.

The aerosol-generating system may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The housing may comprise a cavity for receiving a power supply. The housing may define a cavity for at least partially receiving a removable aerosol-generating article. The housing may comprise a mouthpiece ("outlet end"). The outlet end may comprise at least one air inlet and at least one air outlet. The outlet end may comprise more than one air inlet. One or more of the air inlets may reduce the temperature of the aerosol before it is delivered through an air outlet of the system and may reduce the concentration of the aerosol before it is delivered through an air outlet of the system. As used herein, the term "outlet end" refers to a portion of an aerosol-generating system through which an aerosol generated by the aerosol-generating system is drawn to exit the system.

The system may comprise more than one heating element, for example two, or three, or four, or five, or six or more heating elements. The heating element or heating elements may be arranged appropriately so as to most effectively heat the aerosol-forming substrate.

The at least one electric heating element preferably comprises an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, Constantan, nickel-, cobalt-, chromium-, aluminum-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminum based alloys and iron-manganese-aluminum based alloys. Timetal® is a registered trade mark of Titanium Metals Corporation, 1999 Broadway Suite 4300, Denver Colorado. In composite materials, the electrically resistive material may in some example embodiments be embedded in, encapsulated or coated with an insulating material or vice-versa, depending on the kinetics of energy transfer and the external physicochemical properties required. The heating element may comprise a metallic etched foil insulated between two layers of an inert material. In that case, the inert material may comprise Kapton®, all-polyimide or mica foil. Kapton® is a registered trade mark of E.I. du Pont de Nemours and Company, 1007 Market Street, Wilmington, Delaware 19898, United States of America.

The at least one electric heating element may comprise an infra-red heating element, a photonic source, or an inductive heating element.

The at least one electric heating element may take any suitable form. For example, the at least one electric heating element may take the form of a heating blade. The at least one electric heating element may take the form of a casing or substrate having different electro-conductive portions, or an electrically resistive metallic tube. If the aerosol-forming substrate is a liquid provided within a container, the container may incorporate a disposable heating element. One or more heating needles or rods that run through the center of the aerosol-forming substrate may be used. The at least one electric heating element may be a disk (end) heating element or a combination of a disk heating element with heating needles or rods. The at least one electric heating element may comprise a flexible sheet of material arranged to surround or partially surround the aerosol-forming substrate. Other possibilities include a heating wire or filament, for example a Ni—Cr, platinum, tungsten or alloy wire, or a heating plate. In some example embodiments, the heating element may be deposited in or on a rigid carrier material.

The at least one electric heating element may comprise a heat sink, or heat reservoir comprising a material capable of absorbing and storing heat and subsequently releasing the heat over time to the aerosol-forming substrate. The heat sink may be formed of any suitable material, such as a suitable metal or ceramic material. Preferably, the material has a high heat capacity (sensible heat storage material), or is a material capable of absorbing and subsequently releasing heat via a reversible process, such as a high temperature phase change. Suitable heat storage materials include silica gel, alumina, carbon, glass mat, glass fiber, minerals, a metal or alloy such as aluminum, silver or lead, and a cellulose material such as paper. Other materials which release heat via a reversible phase change include paraffin, sodium acetate, naphthalene, wax, polyethylene oxide, a metal, metal salt, a mixture of eutectic salts or an alloy.

The heat sink or heat reservoir may be arranged such that it is directly in contact with the aerosol-forming substrate and can transfer the stored heat directly to the substrate. The heat stored in the heat sink or heat reservoir may be transferred to the aerosol-forming substrate by means of a heat conductor, such as a metallic tube.

The at least one heating element may heat the aerosol-forming substrate by conduction. The heating element may be at least partially in contact with the substrate, or a carrier on which the substrate is deposited. The heat from the heating element may be conducted to the substrate by a heat conductive element.

The at least one heating element may transfer heat to the incoming ambient air that is drawn through the electrically heated aerosol generating system during use, which in turn heats the aerosol-forming substrate by convection. The ambient air may be heated before passing through the aerosol-forming substrate. If the aerosol-forming substrate is a liquid substrate, the ambient air may be first drawn through the substrate and then heated.

The at least one heating element may comprise an inductive heating element, such that, where the system consists of an aerosol generating device and a removable aerosol-generating article, no electrical contacts are formed between the article and the device. The device may comprise an inductor coil and a power supply configured to provide high frequency oscillating current to the inductor coil. The article may comprise a susceptor element positioned to heat the aerosol-forming substrate. As used herein, a high frequency oscillating current means an oscillating current having a frequency of between 500 kHz and 10 MHz.

The aerosol-forming substrate may be an aerosol-forming liquid. In such embodiments, preferably the storage portion is a liquid storage portion for storing the aerosol-forming liquid. Liquid aerosol-forming substrate is a substrate capable of releasing volatile compounds that can form an aerosol. The volatile compounds may be released by heating the liquid aerosol-forming substrate with the electric heater.

The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise a tobacco-containing material containing volatile tobacco flavor compounds, which are released from the aerosol-forming substrate upon heating. The liquid aerosol-forming substrate may comprise homogenized tobacco material. The liquid aerosol-forming substrate may comprise a non-tobacco-containing material. The liquid aerosol-forming substrate may comprise homogenized plant-based material.

The liquid aerosol-forming substrate may comprise at least one aerosol-former. An aerosol-former is any suitable known compound or mixture of compounds that, in use, facilitates formation of a dense and stable aerosol and that is substantially resistant (e.g., resistant within manufacturing tolerances and/or material tolerances) to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavorants.

The aerosol-forming substrate may comprise nicotine and at least one aerosol former. The aerosol former may be glycerine. The aerosol-former may be propylene glycol. The aerosol former may comprise both glycerine and propylene glycol. The aerosol-forming substrate may have a nicotine concentration of between about 2% and about 10%.

Although reference is made to liquid aerosol-forming substrates above, it will be clear to one of ordinary skill in the art that other forms of aerosol-forming substrate may be used with other embodiments. For example, the aerosol-forming substrate may be a solid aerosol-forming substrate. The aerosol-forming substrate may comprise both solid and liquid elements. The aerosol-forming substrate may comprise a tobacco-containing material containing volatile tobacco flavor compounds which are released from the substrate upon heating. The aerosol-forming substrate may comprise a non-tobacco material. The aerosol-forming substrate may further comprise an aerosol former. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenized tobacco, extruded tobacco, cast leaf tobacco and expanded tobacco. The solid aerosol-forming substrate may be in loose form, or may be provided in a suitable container or cartridge. In some example embodiments, the solid aerosol-forming substrate may contain additional tobacco or non-tobacco volatile flavor compounds, to be released upon heating of the substrate. The solid aerosol-forming substrate may also contain capsules that, for example, include the additional tobacco or non-tobacco volatile flavor compounds and such capsules may melt during heating of the solid aerosol-forming substrate.

As used herein, homogenized tobacco refers to material formed by agglomerating particulate tobacco. Homogenized tobacco may be in the form of a sheet. Homogenized tobacco material may have an aerosol-former content of greater than 5% on a dry weight basis. Homogenized tobacco material may alternatively have an aerosol former content of between 5% and 30% by weight on a dry weight basis. Sheets of homogenized tobacco material may be formed by agglomerating particulate tobacco obtained by grinding or otherwise comminuting one or both of tobacco leaf lamina and tobacco leaf stems. Alternatively, or in addition, sheets of homogenized tobacco material may comprise one or more of tobacco dust, tobacco fines and other particulate tobacco by-products formed during, for example, the treating, handling and shipping of tobacco. Sheets of homogenized tobacco material may comprise one or more intrinsic binders, that is tobacco endogenous binders, one or more extrinsic binders, that is tobacco exogenous binders, or a combination thereof to help agglomerate the particulate tobacco; alternatively, or in addition, sheets of homogenized tobacco material may comprise other additives including, but not limited to, tobacco and non-tobacco fibers, aerosol-formers, humectants, plasticizers, flavorants, fillers, aqueous and non-aqueous solvents and combinations thereof.

In some example embodiments, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fiber mat, a low mass open mesh metallic screen, or a perforated metallic foil or any other thermally stable polymer matrix.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavor delivery during use.

The storage portion of the aerosol-generating system may comprise a housing that is substantially cylindrical, wherein an opening is at one end of the cylinder. The housing of the storage portion may have a substantially circular cross section. The housing may be a rigid housing. As used herein, the term 'rigid housing' is used to mean a housing that is self-supporting. The rigid housing of the storage portion may provide mechanical support to the electric heater. The storage portion may be a liquid storage portion. The storage portion may be a liquid storage portion containing an aerosol forming liquid.

Where the aerosol-forming substrate is a liquid, the storage portion may further comprise a carrier material within the housing for holding the aerosol-forming substrate.

The liquid aerosol-forming substrate may be adsorbed or otherwise loaded onto a carrier or support. The carrier material may be made from any suitable absorbent plug or body, for example, a foamed metal or plastics material, polypropylene, terylene, nylon fibers or ceramic. The liquid aerosol-forming substrate may be retained in the carrier material prior to use of the aerosol-generating system. The liquid aerosol-forming substrate may be released into the carrier material during use. The liquid aerosol-forming substrate may be released into the carrier material immediately prior to use. For example, the liquid aerosol-forming substrate may be provided in a capsule. The shell of the capsule may melt upon heating by the heating means and releases the liquid aerosol-forming substrate into the carrier material. The capsule may in some example embodiments contain a solid in combination with the liquid.

In one example, the liquid aerosol-forming substrate is held in capillary material. A capillary material is a material that actively conveys liquid from one end of the material to another. The capillary material may be advantageously oriented in the storage portion to convey liquid aerosol-forming substrate to the electric heater. The capillary material may have a fibrous structure. The capillary material may have a spongy structure. The capillary material may comprise a bundle of capillaries. The capillary material may comprise a plurality of fibers. The capillary material may comprise a plurality of threads. The capillary material may comprise fine bore tubes. The capillary material may comprise a combination of fibers, threads and fine-bore tubes. The fibers, threads and fine-bore tubes may be generally aligned to convey liquid to the electric heater. The capillary material may comprise sponge-like material. The capillary material may comprise foam-like material. The structure of the capillary material may form a plurality of small bores or tubes, through which the liquid can be transported by capillary action.

The capillary material may comprise any suitable material or combination of materials. Examples of suitable materials are a sponge or foam material, ceramic- or graphite-based materials in the form of fibers or sintered powders, foamed metal or plastics materials, a fibrous material, for example made of spun or extruded fibers, such as cellulose acetate, polyester, or bonded polyolefin, polyethylene, terylene or polypropylene fibers, nylon fibers or ceramic. The capillary material may have any suitable capillarity and porosity so as to be used with different liquid physical properties. The liquid aerosol-forming substrate has physical properties, including but not limited to viscosity, surface tension, density, thermal conductivity, boiling point and atom pressure, which allow the liquid to be transported through the capillary material by capillary action. The capillary material may be configured to convey the aerosol-forming substrate to the atomizer.

The aerosol-generating system may comprise a power supply. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy for one or more aerosol generation experiences; for example, the power supply may have sufficient capacity to allow for the continuous generation of aerosol for a period of around six minutes, or for a period that is a multiple of six minutes. In another example, the power supply may have sufficient capacity to allow for a desired (or, alternatively, predetermined) number of draws of air or discrete activations of the heating means and actuator.

The system comprises electric circuitry connected to the sensor. The electric circuitry may form part of a control system connected to the heating means and to an electrical power source. The electric circuitry may be configured to monitor the electrical resistance of the electric heater and to control the supply of power to the electric heater dependent on the electrical resistance of the electric heater.

The electric circuitry may comprise a microprocessor, which may be a programmable microprocessor, a microcontroller, or an application specific integrated chip (ASIC) or other electronic circuitry capable of providing control. The electric circuitry may comprise further electronic elements. The electric circuitry may be configured to regulate a supply of power to the electric heater. Power may be supplied to the electric heater continuously following activation of the system or may be supplied intermittently, such as on a draw-by-draw basis. The power may be supplied to the electric heater in the form of pulses of electrical current.

The control system may comprise an ambient temperature sensor, to detect the ambient temperature. The control system may comprise a temperature sensor within the storage portion, to detect the temperature of the aerosol-forming substrate held in the storage portion. The one or more temperature sensors may be in communication with the control system to enable the control system to maintain the temperature of the aerosol-forming substrate at the desired (or, alternatively, predetermined) temperature. The one or more temperature sensors may be a thermocouple. The electric heater may be used to provide information relating to the temperature. Temperature dependent resistive properties of the electric heater may be known and used to determine the temperature of the at least one heating element in a manner known to the skilled person.

The aerosol-generating system may comprise a sensor configured to detect an activation of the system. The sensor may comprise a detector in communication with the electric circuitry. The detector may be configured to detect when air is drawn through the system. The electric circuitry may be configured to control power to the at least one heating element in dependence on the input from the detector.

The aerosol-generating system may comprise an adult vaper input, such as a switch or button. This enables the adult vaper to turn the system on. The switch or button may activate the electric heater. The switch or button may initiate the aerosol generation. The switch or button may prepare the electric circuitry to await input from the sensor.

The aerosol-generating system may comprise a temperature sensor. The temperature sensor may be adjacent to the storage portion. The temperature sensor may be in communication with the electric circuitry to enable the electric circuitry to maintain the temperature of the electric heater at the desired (or, alternatively, predetermined) operating temperature. The temperature sensor may be a thermocouple, or alternatively the at least one heating element may be used to provide information relating to the temperature. The temperature dependent resistive properties of the at least one heating element may be known and used to determine the temperature of the at least one heating element in a manner known to the skilled person.

The aerosol-generating system may comprise an aerosol generating device and a removable aerosol-generating article for use with the device. For example, the aerosol-generating article may comprise a cartridge. The aerosol-generating article comprises the storage portion. The device may comprise a power supply and the electric circuitry. The electric heater may form part of the device or the article, or both the device and the article.

The system may comprise a cartridge removably coupled to an aerosol-generating device. The cartridge may be removed from the aerosol-generating device when the aerosol-forming substrate has been consumed. The cartridge may be disposable. The cartridge may be reusable. The cartridge may be refillable with liquid aerosol-forming substrate. The cartridge may be replaceable in the aerosol-generating device. The aerosol-generating device may be reusable. The cartridge may be manufactured at low cost, in a reliable and repeatable fashion. As used herein, the term 'removably coupled' is used to mean that the cartridge and device can be coupled and uncoupled from one another without significantly damaging either the device or cartridge. The cartridge may have a housing within which an aerosol-forming substrate is held. The cartridge may comprise a lid. The lid may be peelable before coupling the cartridge to the aerosol-generating device. The lid may be piercable.

The aerosol-generating system may comprise an aerosol-forming chamber in which aerosol forms from a super saturated vapor, which aerosol is then drawn out of the system via an air outlet. An air inlet, air outlet and the chamber are preferably arranged so as to define an airflow route from the air inlet to the air outlet via the aerosol-forming chamber, so as to convey the aerosol to the air outlet.

Features described in relation to one or more example embodiments may equally be applied to other aspects of the inventive concepts. For example, features described in relation to the method of a first example embodiment may be equally applied to the method of a second example embodiment, to the system of a third example embodiment and to the system of a fourth example embodiment, and vice versa.

FIG. 1 shows one example of an electrically heated aerosol generating system. In FIG. 1, the system is an aerosol generating system having a liquid storage portion. The aerosol generating system 100 of FIG. 1 comprises a housing 101 having an outlet end 103 and a body end 105. In the body end, there is provided an electric power supply in the form of battery 107, electric circuitry in the form of hardware 109 and a sensor 111. In the outlet end, there is provided a liquid storage portion in the form of cartridge 113 containing aerosol-forming liquid 115, a capillary wick 117 and a heater 119 comprising at least one heating element. Note that the electrically heated aerosol generating system is only shown schematically in FIG. 1. One end of the capillary wick 117 extends into the cartridge 113 and the other end of the capillary wick 117 is surrounded by the heating element 119. The heating element is connected to the electric circuitry 109 via connections 121. The housing 101 also includes an air inlet 123, an air outlet 125 at the outlet end and an aerosol-forming chamber 127.

The electric circuitry may include a processor and a memory. The memory may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM). The processor may be, a central processing unit (CPU), a controller, or an application-specific integrated circuit (ASIC), that when, executing instructions stored in the memory, configures the processor as a special purpose computer to perform the operations of the electric circuitry. Such operations performed by the electric circuitry may include controlling a supply of electrical power from a power supply of the aerosol-generating system to one or more of a pump of the aerosol-generating system and one or more elements (e.g., a heating element) of a vaporizer of the aerosol-generating system.

In use, operation is as follows. Liquid 115 is transferred or conveyed by capillary action from the cartridge 113 from the end of the wick 117 which extends into the cartridge to the other end of the wick 117 which is surrounded by the heating element 119. When air is drawn through the air outlet 125, ambient air is drawn through air inlet 123. In the arrangement shown in FIG. 1, the sensor 111 senses the draw of air from the air inlet 123 to the air outlet 125 and activates the heating element 119. The battery 107 supplies energy to the heating element 119 to heat the end of the wick 117 surrounded by the heating element. The liquid in that end of the wick 117 is vaporized by the heating element 119 to create a supersaturated vapor. At the same time, the liquid being vaporized is replaced by further liquid moving along the wick 117 by capillary action. (This is sometimes referred to as "pumping action".) The supersaturated vapor created is mixed with and carried in the airflow from the air inlet 123. In the aerosol-forming chamber 127, the vapor condenses to form an aerosol, which is carried towards the outlet 125.

The capillary wick can be made from a variety of porous or capillary materials and preferably has a known, predefined capillarity. Examples include ceramic- or graphite-based materials in the form of fibers or sintered powders. Wicks of different porosities can be used to accommodate different liquid physical properties such as density, viscosity, surface tension and vapor pressure. The wick must be suitable so that the required amount of liquid can be delivered to the heating element. The wick and heating element must be suitable so that the required amount of aerosol can be conveyed.

FIG. 1 shows one example of an electrically heated aerosol generating system that may be used with the inventive concepts. Many other examples are usable with the inventive concepts, however. The electrically heated aerosol generating system simply needs to include or receive an aerosol forming substrate which can be heated by at least one electric heating element, powered by a power supply under the control of electric circuitry. For example, the system need not be an aerosol generating system. For example, the aerosol forming substrate may be a solid substrate, rather than a liquid substrate. The aerosol forming substrate may be another form of substrate such as a gas substrate. The heating element may take any appropriate form. The overall shape and size of the housing could be altered and the housing could comprise a separable shell and outlet end. Other variations are, of course, possible.

In the example embodiments shown in FIG. 1, the hardware 109 and the sensor 111 are programmable and are configured to measure an activation parameter of the device and to store measured values of the activation parameter in a usage log, as discussed below in relation to FIGS. 4 to 6. Example activation parameters include the number ("quantity") of activations detected by the sensor 111 in a given period, the duration of each activation, and the interval, or "inactivation duration", between consecutive activations. The hardware 109 and sensor 111 can also be used to manage the device operation. This assists with control of the particle size in the aerosol.

As mentioned above, the heating element 119 is activated when the sensor 111 detects air being drawn from the air inlet 123 to the air outlet 125. The adult vaper controls the duration and the frequency of the activations. This means that a usage profile of the system 100 can vary between different adult vapers. The term "usage profile" refers to the relationship between activations and time.

Figure 2:
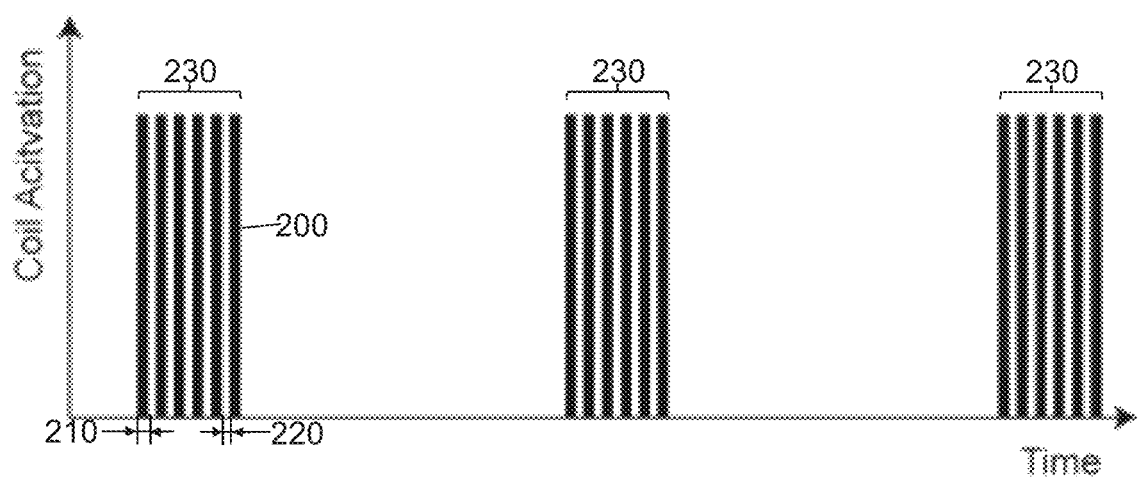
FIG. 2 illustrates a graph of heating element activation over time according to a first example usage profile of the aerosol generating system of FIG. 1.

FIG. 2 illustrates a simplified graph of heating element activation over time according to a first example usage profile of the aerosol generating system of FIG. 1. In FIG. 2, the y-axis represents a simplified "on" or "off" state for the heating element. The activations 200, during which the heating element is activated, each have an activation duration 210. Each interval between consecutive activations represents a period of non-use having an inactivation duration 220. As shown, in the first usage profile, the activations 200 are grouped into a number of discrete aerosol generations 230 which are separated by prolonged periods of inactivity. Consequently, the first usage profile is described herein as a "aerosol generation" profile.

Figure 3:
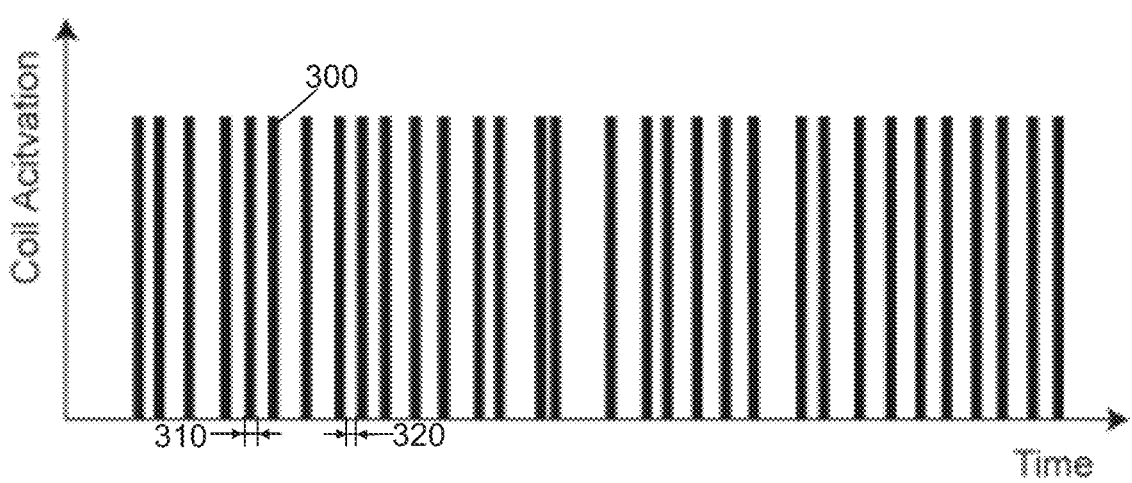
FIG. 3 illustrates a graph of heating element activation over time according to a second example usage profile of the aerosol generating system of FIG. 1.

FIG. 3 illustrates a simplified graph of heating element activation over time according to a second example usage profile of the aerosol generating system of FIG. 1. As with FIG. 2, the y-axis represents a simplified "on" or "off" state for the heating element activations 300, during which the heating element is activated, each have an activation duration 310. Each interval between consecutive adult vaper operations represents a period of non-use having an inactivation duration 320. As shown, in the second usage profile, the system is used frequently without any prolonged periods of inactivity. The second usage profile is described herein as a "grazing" profile. The different usage characteristics of the aerosol generation and grazing profiles may result in the aerosol generation and grazing profiles exhibiting different aerosol forming liquid consumption rates for an equivalent amount of use. For example, due to differences in heating element temperature or aerosol forming liquid viscosity resulting from the different usage profiles.

Figure 4:
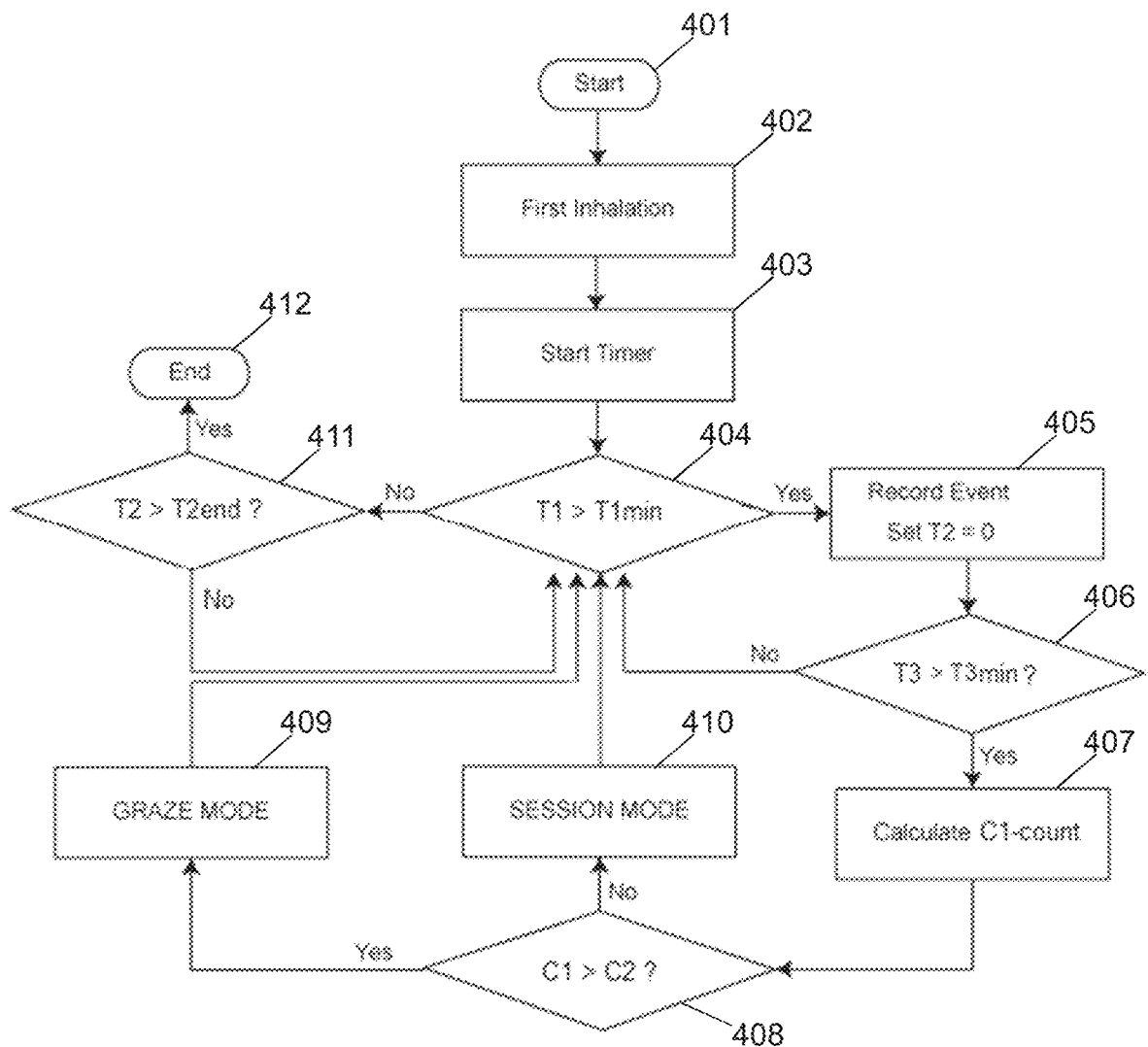
FIG. 4 is a flowchart of a method for determining a usage profile according to some example embodiments.

FIG. 4 is a flowchart of a method for determining a usage profile according to some example embodiments.

At step 401, a usage profile determination procedure is initiated. At step 402, a first inhalation ("first draw"), or first activation, is detected by the sensor. The usage profile determination procedure may be initiated manually by the adult vaper at step 401 or may be initiated automatically when the first activation is detected by the sensor. In such situations, steps 401 and 402 occur simultaneously. At step 403, a timer within the device is started when the first activation is detected by the sensor. The timer measures both a running total of elapsed time, T3, since the first draw and an inactivity duration, T2, between consecutive draws.

At step 404, the sensor and the electric circuitry determine whether any activations with an activation duration T1 of greater than a minimum activation duration threshold T1min occur. If an activation with an activation duration T1 exceeding the minimum activation duration threshold T1min occurs, the process moves on to step 405. If not, the process moves on to step 411. T1min may be any suitable period of time. For example, T1min may be from between about 0.5 seconds to 2 seconds. In one example, T1min is set at about 1 second.

At step 405, the activation is stored as a discrete event in a usage log by the electric circuitry. This allows a running count of the number of activation events to be kept in the usage log. The timer then resets the inactivation duration T2 to zero so that the interval to the next activation can be measured. By storing in the usage log only activations which exceed the minimum activation duration threshold T1min, the system can avoid counting as valid events any activations which do not correspond to a normal draw. For example when an adult vaper activates the device without drawing any aerosol, such as in order to prime the device. The elapsed time T3 at which the valid activation occurred may also be stored by the electric circuitry in the usage log.

At step 406, the electric circuitry compares the elapsed time T3 to a threshold elapsed time T3min. The threshold elapsed time T3min represents a desired (or, alternatively, predetermined) minimum time period over which the activations are monitored to determine the usage profile. If the elapsed time T3 exceeds the threshold elapsed time T3min, the process moves on to step 407. If the elapsed time T3 does not exceed the threshold elapsed time T3min, the process returns to step 404. In this manner, valid activations detected during the monitoring period T3 are stored in the usage log to provide a count of activation events and thus build up a picture of the usage profile. T3min may be any suitable time which is sufficient to allow the usage profile to be assessed. For example, T3min may be from about 5 minutes to about 30 minutes, or from about 10 minutes to about 20 minutes. In one example, T3min is set at about 15 minutes.

At step 407, once the threshold time T3min has been reached, the electric circuitry calculates the total number, or "count", of valid activation events C1 stored in the usage log during the monitoring period T3.

At step 408, the electric circuitry compares the total count of activation events C1 to a threshold count C2 to determine the usage profile to select. If the total count C1 exceeds the threshold count C2, the electric circuitry determines that the usage profile corresponds to the "grazing" profile and selects "grazing mode", shown at step 409. If the total count C1 does not exceed the threshold count C2, the electric circuitry determines that the usage profile is the "session" profile ("aerosol generation profile") and selects "session mode" ("aerosol generation mode"), shown at step 410. The electric circuitry may cause the system to execute the selected mode. In both cases, the process returns to step 404. As described above, at step 404, the sensor and the electric circuitry determine whether any activations with an activation duration T1 of greater than a minimum activation duration threshold T1min occur. If so, the process moves on to step 405. If not, the process moves on to step 411.

At step 411, the electric circuitry compares the inactivation duration T2 since the previous valid activation to an inactivation duration threshold T2end. If T2 exceeds T2end, the usage profile determination procedure is ended at step 412. If T2 does not exceed T2end, the process returns again to step 404. The process continually loops between steps 404 and 411 either until an activation with an activation duration T1 exceeding the minimum activation duration threshold T1min is detected, in which case the process moves to step 405, or until the inactivation duration T2 between successive valid activations exceeds the inactivation duration threshold T2end, in which case the procedure ends at step 412. The inactivation duration threshold T2end may be any suitable amount of time. For example, T2end may be from about 5 minutes to about 25 minutes, from about 10 minutes to about 20 minutes, or from about 10 minutes to about 15 minutes. In some examples, T2end is about 15 minutes.

At step 412, the procedure is ended and the system may remain in the selected usage mode (also referred to herein as "operating mode") when next used, without the need for further data collection before selecting the usage mode. The electric circuitry may cause the system to execute the selected mode. Once the procedure has ended at step 412, the next activation may be regarded by the system as the "first draw" and the process repeated from step 401. The system may remain in the most recently selected usage mode until a subsequent usage profile determination procedure determines that a different usage mode is exhibited. The system also comprises a clock and is configured to determine the usage profile at different times of the day. This allows any time-dependent variations in usage profile to be taken into account, for example where an adult vaper exhibits an aerosol generation profile during the day and a grazing profile during the evening, or vice versa. In such examples, the system may reset to a particular usage mode at certain times of the day.

Identifying a usage profile and selecting a usage mode may allow the system to be customized according to how it is used. For example, where the grazing mode is selected, the system may display information on a display showing the estimated number of draws remaining or the usage time remaining. This may be calculated from an estimation of the remaining amount of aerosol forming substrate and from an average amount of aerosol forming substrate consumed during each activation. The remaining amount of aerosol forming substrate may be estimated, for example, by monitoring one or more usage parameters of the system, referring to a look-up table or using a formula to estimate the amount of aerosol forming substrate that has already been consumed based on the monitored usage parameters, and subtracting this estimated amount from an initial amount. Example factors which may be used as inputs in the estimation of the aerosol forming substrate remaining include, but are not limited to power delivered to the heating element, temperature of the heating element, resistance of the heating element, and airflow through the system. The average amount of aerosol forming substrate consumed during each activation may be determined by monitoring the use of the system, or by using typical values stored in the device. In another example, where the aerosol generation mode is selected, the system may display information on a display showing the estimated number of aerosol generations remaining. This may be more useful information to an adult vaper than information on the remaining amount of aerosol forming substrate or the remaining number of activations.

Identifying a usage profile and selecting a usage mode may also allow the system to more accurately calculate the remaining amount of aerosol forming substrate remaining. For example, in a grazing usage profile, the heating element and the storage portion may remain at elevated temperatures as there may be insufficient time for cooling between subsequent activations of the device. In contrast, in an aerosol generation usage profile, the heating element and storage portion may be allowed to cool between subsequent aerosol generations. The differences in temperature between grazing and aerosol generation usage profiles may affect variables such as liquid viscosity (where the aerosol forming substrate comprises a liquid element), wicking rate, and the time taken for the heating element and the aerosol forming substrate to heat up to an aerosolization temperature. These variables may affect the consumption rate of the aerosol forming substrate. Thus, an adjustment factor may be included in any calculations of estimated aerosol forming substrate remaining, the adjustment factor depending on which usage mode is selected.

Figure 5:
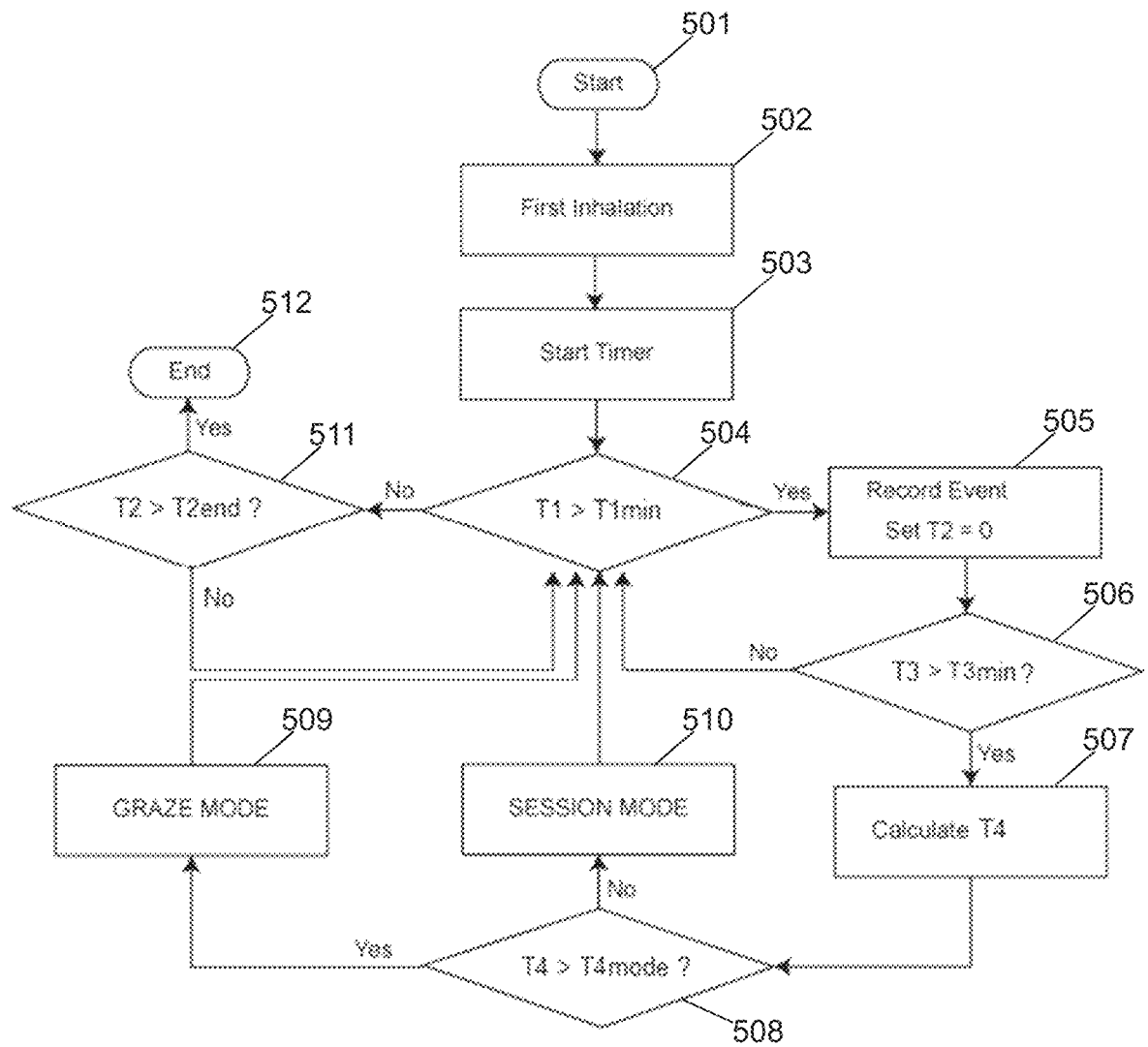
FIG. 5 is a flowchart of a method for determining a usage profile according to some example embodiments.

FIG. 5 is a flowchart of a method for determining a usage profile according to some example embodiments. The method in FIG. 5 is very similar to the method of FIG. 4. Steps 501 to 504 of the method shown in FIG. 5 are the same as steps 401 to 404 of the method shown in FIG. 4. The subsequent steps differ, as discussed below.

At step 505, the activation duration T1 is stored in the usage log by the electric circuitry to allow a total activation duration T4 to be calculated. The timer then resets the inactivation duration T2 to zero so that the interval to the next activation can be measured. As with the method of FIG. 4, by storing in the usage log only activations which exceed the minimum activation duration threshold T1min, the system can avoid counting as valid events any activations which do not correspond to a normal draw. For example when an adult vaper activates the device without drawing any aerosol, such as in order to prime the device. The elapsed time T3 at which the valid activation occurred may also be stored in the usage log by the electric circuitry.

At step 506, as with step 406 of the first method, the electric circuitry compares the elapsed time T3 to a threshold elapsed time T3end. The threshold elapsed time T3min represents a desired (or, alternatively, predetermined) minimum time period over which the activations are monitored to determine the usage profile. If the elapsed time T3 exceeds the threshold elapsed time T3min, the process moves on to calculation step 507. If the elapsed time T3 does not exceed the threshold elapsed time T3min, the process returns to step 504. T3min may be any suitable time which is sufficient to allow the usage profile to be assessed. For example, T3min may be from about 5 minutes to about 30 minutes, or from about 10 minutes to about 20 minutes. In one example, T3min is set at about 15 minutes.

At step 507, the electric circuitry calculates the total activation duration T4 by adding together the individual activation durations T1 of each activation event stored in the usage log since the procedure started, that is, during the monitoring period T3.

At step 508, the electric circuitry compares the total activation duration T4 to a total activation duration threshold T4mode to determine which usage profile to select. If T4 exceeds T4mode, the electric circuitry determines that the usage profile corresponds to the "grazing" profile and selects "grazing mode", shown at step 509. If T4 does not exceed T4mode, the electric circuitry determines that the usage profile is the "aerosol generation" profile and selects "aerosol generation mode", shown at step 510. T4mode may be any suitable amount and may depend on the duration of the threshold elapsed time T3min for the procedure. For example, T4mode may be from about 5 percent to about 15 percent of the time selected for T3min. In one such example, T3min is 15 minutes and T4mode is 1 minute. So, if the total activation time is more than 1 minute in a 15 minute monitoring period, grazing mode is selected rather than aerosol generation mode. Once the usage profile has been determined at step 508 and the usage mode selected at step 509 or step 510, the process returns to step 504.

As described above in respect of step 404 of the first method, at step 504, the sensor and the electric circuitry determine whether any activations with an activation duration T1 of greater than a minimum activation duration threshold T1min occur. If so, the process moves on again to step 505. If not, the process moves on to step 511.

At step 511, the electric circuitry compares the inactivation duration T2 since the most recent valid activation to an inactivation duration threshold T2end. If T2 exceeds T2end, the usage profile determination procedure is ended at step 512. If T2 does not exceed T2end, the process returns again to step 504. The process continually loops between steps 504 and 511 either until an activation with an activation duration T1 exceeding the minimum activation duration threshold T1min is detected, in which case the process moves to step 505, or until the inactivation duration T2 since the most recent valid activation exceeds the inactivation duration threshold T2end, in which case the procedure ends at step 512. The inactivation duration threshold T2end may be any suitable amount of time. For example, T2end may be from about 5 minutes to about 25 minutes, from about 10 minutes to about 20 minutes, or from about 10 minutes to about 15 minutes. In some examples, T2end is about 15 minutes.

At step 512, the procedure is ended and the system may remain in the selected usage mode when next used, without the need for further data collection before selecting the usage mode. Once the procedure has ended at step 512, the next activation may be regarded by the system as the "first draw" and the process repeated from step 501. The system may remain in the most recently selected usage mode until a subsequent usage profile determination procedure determines that a different usage mode is exhibited. The system also comprises a clock and is configured to determine the usage profile at different times of the day. This allows any time-dependent variations in usage profile to be taken into account, for example where an adult vaper exhibits an aerosol generation profile during the day and a grazing profile during the evening, or vice versa. In such examples, the system may reset to a particular usage mode at certain times of the day.

Figure 6:
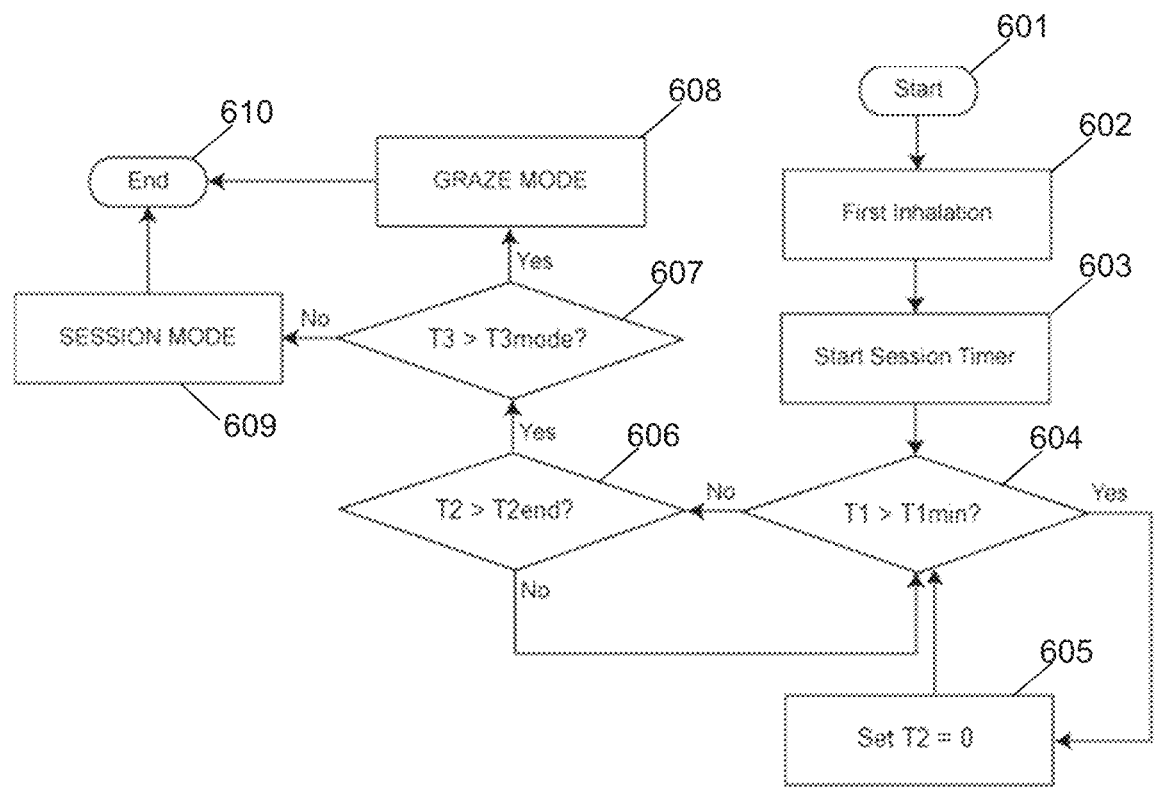
FIG. 6 is a flowchart of a method for determining a usage profile according to some example embodiments.

FIG. 6 is a flowchart of a method for determining a usage profile according to some example embodiments of the inventive concepts. Steps 601 to 603 of the method shown in FIG. 6 are the same as steps 401 to 403 of the method illustrated in FIG. 4 and steps 501 to 503 of the method illustrated in FIG. 5.

At step 604, as with steps 404 and 504, the sensor and the electric circuitry determine whether any activations with an activation duration T1 of greater than a minimum activation duration threshold T1min occur. T1min may be any suitable period of time. For example, T1min may be from between about 0.5 seconds to 2 seconds. In one example, T1min is set at about 1 second. If an activation with an activation duration T1 exceeding the minimum activation duration threshold T1min occurs, the process moves on to step 605. If not, the process moves on to step 606.

At step 605, the timer resets the inactivation duration T2 to zero so that the interval to the next activation can be measured. By resetting the inactivation duration T2 to zero only when an activation with a duration T1 of greater than the threshold duration T1min, the system can avoid the usage determination being adversely affected by activations which do not correspond to a normal draw. For example when an adult vaper activates the device without drawing any aerosol, such as in order to prime the device. The elapsed time T3 at which the valid activation occurred may also be stored in a usage log by the electric circuitry to provide further information to the system. The process then moves on to step 606.

At step 606, the electric circuitry determines whether the inactivation duration T2 since the most recent valid activation exceeds an inactivation duration threshold T2end. The inactivation duration threshold T2end may be any suitable amount of time. For example, T2end may be from about 1 minute to about 10 minutes, from about 1 minutes to about 5 minutes, or from about 10 minutes to about 3 minutes. In some examples, T2end is about 2 minutes. If T2 exceeds T2end, the process moves on to step 607. If T2 does not exceed T2end, the process returns again to step 604. The process continually loops between steps 604 and 606 either until an activation with an activation duration T1 exceeding the minimum activation duration threshold T1min is detected, in which case the process moves to step 605, or until the inactivation duration T2 exceeds the inactivation duration threshold T2end, in which case the process moves to step 607.

At step 607, the electric circuitry compares the elapsed time T3 to a threshold elapsed time T3mode to determine which usage profile to select. If the elapsed time T3 exceeds the threshold elapsed time T3mode the electric circuitry determines that the usage profile corresponds to the "grazing" profile and selects "grazing mode", shown at step 608.

If the elapsed time T3 does not exceed the threshold elapsed time T3mode, the electric circuitry determines that the usage profile is the "aerosol generation" profile and selects "aerosol generation mode", shown at step 609. In both cases, the process then ends at step 610.

As with the first and second methods, the system may remain in the usage mode selected when next used, without the need for further data collection before selecting the usage mode. Once the procedure has ended at step 610, the next activation may be regarded by the system as the "first draw" and the process repeated from step 601. The system may remain in the most recently selected usage mode until a subsequent usage profile determination procedure determines that a different usage mode is exhibited. The system also comprises a clock and is configured to determine the usage profile at different times of the day. The system may then revert to a particular usage mode associated with a particular time of day. This allows any time-dependent variations in usage profile to be taken into account, for example where an adult vaper exhibits an aerosol generation profile during the day and a grazing profile during the evening, or vice versa.

The invention claimed is:

1. A method of operating an electrically operated aerosol generating system, the electrically operated aerosol generating system including a sensor configured to detect an activation of the electrically operated aerosol generating system, and electric circuitry connected to the sensor, the method comprising:
executing a monitoring procedure associated with the electrically operated aerosol generating system at a plurality of time periods during a day, each set of a plurality of usage profiles sets associated with an adult vaper corresponding to a respective one of the plurality of time periods, and each set of the plurality of usage profile sets including a respective plurality of usage profiles for the adult vaper, the monitoring procedure including,
measuring, using the sensor, a usage parameter of the electrically operated aerosol generating system during a first time period of the plurality of time periods of the day, and
selecting a usage profile from the set of usage profiles corresponding to the adult vaper and the first time period based on the measured usage parameter during the first time period;
determining whether a current time period corresponds to the first time period from the plurality of time periods; and
selectively operating the electrically operated aerosol generating system based on the selected usage profile corresponding to the first time period and results of the determining.

2. The method according to claim 1, wherein the usage parameter includes at least one of an activation duration during the monitoring procedure, a total activation duration during the monitoring procedure, a total number of activations during the monitoring procedure, an inactivation duration during the monitoring procedure, a total inactivation duration during the monitoring procedure, or combinations thereof.

3. The method according to claim 1, wherein the selecting the usage profile includes:
selecting a first usage profile based on a determination that the measured usage parameter corresponding to the first time period exceeds a threshold value; and
selecting a second usage profile based on a determination that the measured usage parameter corresponding to the first time period does not exceed the threshold value.

4. The method according to claim 1, wherein
the plurality of time periods includes at least an evening time period and a prior-to-evening time period; and
the executing the monitoring procedure includes,
executing the monitoring procedure at least once during the evening time period of the plurality of time periods to determine an evening usage profile associated with the adult vaper that corresponds to the evening time period from the set of usage profiles corresponding to the evening time period; and
executing the monitoring procedure at least once prior to the evening time period to determine a prior-to-evening usage profile associated with the adult vaper that corresponds to the prior-to-evening time period from the set of usage profiles corresponding to the prior-to-evening time period.

5. The method according to claim 1, further comprising:
measuring a duration of the monitoring procedure,
wherein the selecting the usage profile is executed based on a determination that the duration of the monitoring procedure exceeds a threshold duration.

6. The method according to claim 1, wherein the usage parameter is an inactivation duration during the monitoring procedure.

7. The method according to claim 1, wherein the selecting the usage profile includes:
selecting a first usage profile based on a determination that a duration of the monitoring procedure corresponding to first time period exceeds a threshold duration, and
selecting a second usage profile based on a determination that the duration of the monitoring procedure corresponding to the first time period does not exceed the threshold duration.

8. The method according to claim 1, wherein the executing is based on a determination that a first activation is detected by the sensor.

9. The method according to claim 1, further comprising:
measuring a duration of the monitoring procedure during the first time period of the plurality of time periods of the day; and
the measuring the usage parameter of the electrically operated aerosol generating system during the first time period further includes,
measuring an activation duration for any activations detected during the monitoring procedure corresponding to the first time period, and
disregarding, from the measured usage parameter corresponding to the first time period, any activations for which the activation duration is less than a desired activation duration threshold.

10. The method according to claim 1, further comprising:
calculating an estimated remaining amount of aerosol forming substrate in the aerosol generating system.

11. The method according to claim 10, wherein the calculating includes applying a correction coefficient according to the selected usage profile.

12. The method according to claim 10, wherein,
the electrically operated aerosol generating system further includes a display, and
the method further includes displaying information on the display according to the selected usage profile.

13. The method according to claim 12, wherein,
the information is based on the estimated remaining amount of aerosol forming substrate in the aerosol generating system, and
the information indicates at least one of a remaining number of activations, a remaining activation duration, a remaining number of aerosol generations, or combinations thereof.

14. An electrically operated aerosol generating system, comprising:
a sensor configured to detect an activation of the electrically operated aerosol generating system; and
electric circuitry connected to the sensor, the electric circuitry configured to,
execute a monitoring procedure at a plurality of time periods during a day, the monitoring procedure including,
measuring, using the sensor, a usage parameter of electrically operated aerosol generating system during a first rime period of the plurality of time periods of the day, and
selecting a usage profile of the system from a set of a plurality of usage profiles corresponding to an adult vaper from a plurality of sets of usage profiles sets based on the measured usage parameter at a first time period of a plurality of time periods during a day, each set of the plurality of usage profiles sets associated with the adult vaper corresponding to a respective one of the plurality of time periods during the day, and each set of the plurality of usage profile sets including a respective plurality of usage profiles for the adult vaper;
determine whether current time period corresponds to the first time period from the plurality of time periods; and
selectively operate the electrically operated aerosol generating system based on the selected usage profile corresponding to the first time period and results of the determining.

15. The electrically operated aerosol generating system according to claim 14, wherein the selecting the usage profile includes, for each of the plurality of time periods:
selecting a first usage profile based on a determination that the measured usage parameter corresponding to the time period exceeds a threshold value, and
selecting a second usage profile based on a determination that the measured usage parameter corresponding to the time period does not exceed the threshold value.

16. The electrically operated aerosol generating system according to claim 14, wherein the electric circuitry is further configured to:
perform the selecting the usage profile at least once during an evening time period of the plurality of time periods to select a usage profile associated with the adult vaper from the set of usage profiles that correspond to the evening time period; and
perform the selecting the usage profile at least once prior to the evening time period to select a usage profile associated with the adult vaper from the set of usage profiles that correspond to a prior-to-evening time period of the plurality of time periods.

17. The electrically operated aerosol generating system according to claim 14, wherein the electric circuitry is further configured to:
measure a duration of the monitoring procedure,
wherein the selecting the usage profile is executed based on a determination that the duration of the monitoring procedure exceeds a threshold duration.

18. The electrically operated aerosol generating system according to claim 14, wherein the electric circuitry is further configured to:
calculate an estimated remaining amount of aerosol forming substrate in the aerosol generating system.

19. The electrically operated aerosol generating system according to claim 18, wherein the electric circuitry is further configured to:
apply a correction coefficient according to the selected usage profile.

20. The electrically operated aerosol generating system according to claim 18, wherein
the electrically operated aerosol generating system further includes a display; and
the electric circuitry is further configured to,
display information on the display according to the selected usage profile, the information being based on the estimated remaining amount of aerosol forming substrate in the aerosol generating system, and
the information indicates at least one of a remaining number of activations, a remaining activation duration, a remaining number of aerosol generations, or combinations thereof.

* * * * *